US012092280B2

(12) United States Patent
Lee

(10) Patent No.: US 12,092,280 B2
(45) **Date of Patent: *Sep. 17, 2024**

(54) LAMP FOR VEHICLE AND VEHICLE INCLUDING THE SAME

(71) Applicant: HYUNDAI MOBIS CO., LTD., Seoul (KR)

(72) Inventor: Hyun Soo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,539

(22) Filed: Oct. 11, 2023

(65) Prior Publication Data

US 2024/0035636 A1 Feb. 1, 2024

Related U.S. Application Data

(63) Continuation of application No. 18/068,372, filed on Dec. 19, 2022, now Pat. No. 11,808,425, which is a continuation of application No. 17/806,785, filed on Jun. 14, 2022, now Pat. No. 11,560,995.

(30) Foreign Application Priority Data

Jul. 28, 2021 (KR) ........................ 10-2021-0099036
Sep. 7, 2021 (KR) ........................ 10-2021-0119097

(51) Int. Cl.

| | |
|---|---|
| ***F21S 41/24*** | (2018.01) |
| ***F21S 41/143*** | (2018.01) |
| ***F21S 41/25*** | (2018.01) |
| ***F21S 41/43*** | (2018.01) |

(52) U.S. Cl.
CPC ............. *F21S 41/24* (2018.01); *F21S 41/143* (2018.01); *F21S 41/25* (2018.01); *F21S 41/43* (2018.01)

(58) Field of Classification Search
CPC ........ F21S 41/24; F21S 41/143; F21S 41/148; F21S 41/255; F21S 43/14; F21S 43/26; F21S 43/31; F21S 43/315; F21S 43/40; F21S 41/27; F21W 2102/13; F21W 2103/55
See application file for complete search history.

(56) References Cited

U.S. PATENT DOCUMENTS

| | | | |
|---|---|---|---|
| 2015/0124472 | A1 | 5/2015 | Wintzer et al. |
| 2016/0178155 | A1 | 6/2016 | Owada |
| 2016/0290583 | A1 | 10/2016 | Suwa et al. |

*Primary Examiner* — Elmito Breval
(74) *Attorney, Agent, or Firm* — NovoTechIP International PLLC

(57) ABSTRACT

A lamp for a vehicle including a light source configured to emit light, and a light guide body including a light entering portion, a light exiting portion, and a recessed region disposed between the light entering portion and the light exiting portion and having a shape recessed upward in a lower surface of the light guide body, in which the recessed region includes a first surface formed in a region adjacent to the light entering portion, a second surface connected to the first surface through a first connection portion and extending toward the light exiting portion, and a third surface connected to the second surface through a second connection portion and extending toward the light exiting portion, and in which the second connection portion includes a curved connection portion.

16 Claims, 18 Drawing Sheets

LAMP FOR VEHICLE AND VEHICLE INCLUDING THE SAME

CROSS-REFERENCE TO RELATED APPLICATION

This application is a continuation application from U.S. application Ser. No. 18/068,372 filed on Dec. 19, 2022 entitled "LAMP FOR VEHICLE AND VEHICLE INCLUDING THE SAME", which is a continuation application from U.S. application Ser. No. 17/806,785 filed on Jun. 14, 2022, entitled "LAMP FOR VEHICLE AND VEHICLE INCLUDING THE SAME", and now issued as U.S. patent Ser. No. 11/560,995, which claim priority to and the benefit of Korean Patent Application No. 10-2021-0099036 filed in the Korean Intellectual Property Office on Jul. 28, 2021, and Korean Patent Application No. 10-2021-0119097 filed in the Korean Intellectual Property Office on Sep. 7, 2021, the entire contents of which are incorporated herein by reference.

TECHNICAL FIELD

The present disclosure relates to a lamp for a vehicle and a vehicle including the same.

BACKGROUND ART

Various types of vehicle lamps, which are classified depending on functions thereof, are mounted in a vehicle. For example, low beam lamps, high beam lamps, daytime running light (DRL) lamps, and the like are mounted on a front side of the vehicle. Among the vehicle lamps, the low beam lamp forms a light distribution pattern having a shape of a cut-off line formed at an upper side thereof.

The low beam lamp in the related art has a cut-off portion having a shape corresponding to a shape of the cut-off line, and the cut-off portion is formed at a position at which a focal point is formed in order to form the above-mentioned cut-off line. However, when parallel light (hereinafter, referred to as 'horizontal non-axial light') having an angle in a horizontal direction enters a cut-off portion provided in the form of a line existing on a single plane, a position of a focal point varies depending on a color of the light. For this reason, the focal point is not coincident with the cut-off portion provided in the form of a line existing on a single plane. As a result, light blurring occurs because of aberration.

The light blurring causes light blindness to a driver and pedestrian positioned in front of the vehicle and hinders a visual field of the driver and pedestrian, which may cause a traffic accident.

SUMMARY

The present disclosure has been made in an effort to provide a lamp for a vehicle, which includes a curved line connection portion having a shape corresponding to a line connecting a plurality of focal points formed depending on respective colors of horizontal non-axial light beams, thereby preventing light blurring and light blindness occurring at an upper side of a cut-off line. The present disclosure has also been made in an effort to provide a vehicle including the lamp.

An exemplary embodiment of the present disclosure provides a lamp for a vehicle, the lamp including: a light source configured to emit light; and a light guide body including a light entering portion disposed at one side of the light source and configured such that the light enters the light entering portion, a light exiting portion configured such that the light entering the light entering portion exits the light exiting portion, and a recessed region disposed between the light entering portion and the light exiting portion and having a shape recessed upward in a lower surface of the light guide body, in which the recessed region includes: a first surface formed in a region adjacent to the light entering portion; a second surface connected to the first surface through a first connection portion and extending toward the light exiting portion; and a third surface connected to the second surface through a second connection portion and extending toward the light exiting portion, and in which the second connection portion includes a curved connection portion.

The second surface may be formed in parallel with an optical axis of the light exiting portion.

The second connection portion may further include straight connection portions formed at two opposite sides of the curved connection portion.

The curved connection portion may have a predetermined curvature.

The curved connection portion may have a shape corresponding to a line connecting a plurality of focal points formed for respective colors of the light which is emitted from the light source and enters through the light entering portion.

The curved connection portion may have a shape recessed in a direction from the light exiting portion to the light entering portion.

The third surface may be connected to the second surface through the second connection portion and include a vertical surface having a vertical cross-section corresponding to a shape of the second connection portion as the second connection portion vertically extends downward.

The third surface may further include: a horizontal surface connected to the vertical surface and horizontally extending; and an inclined surface connected to the horizontal surface and inclined downward in the direction from the light entering portion to the light exiting portion.

The recessed region may further include a cut-off portion provided on the second surface and having a stepped shape.

The cut-off portion may include: a lower cut-off portion formed at one side in a leftward/rightward direction based on a direction from the light entering portion to the light exiting portion; an upper cut-off portion formed at the other side in leftward/rightward direction based on the direction from the light entering portion to the light exiting portion and disposed upward from the lower cut-off portion; and a stepped cut-off portion configured to connect the lower cut-off portion and the upper cut-off portion.

The curved connection portion may include: an upper curved connection portion formed in a section in which the upper cut-off portion of the recessed region and the third surface meet together; and a lower curved connection portion formed in a section in which the lower cut-off portion of the recessed region and the third surface meet together.

The curved connection portion may further include a stepped curved connection portion formed in a section in which the stepped cut-off portion of the recessed region and the third surface meet together.

The straight connection portions may include: an upper straight connection portion formed in a section in which the upper cut-off portion of the recessed region and the third surface meet together; and a lower straight connection portion formed in a section in which the lower cut-off portion of the recessed region and the third surface meet together.

The first surface may have a shape inclined upward in a direction from the light entering portion to the light exiting portion.

The second connection portion may be formed symmetrically in a leftward/rightward direction with respect to a central portion of the light guide body when viewing the light guide body from above.

The light entering portion may have a curved shape convexly protruding toward the light source.

The light exiting portion may have a curved shape protruding in a direction in which the light entering through the light entering portion exits.

Another exemplary embodiment of the present disclosure provides a vehicle including: a lamp for a vehicle, in which the lamp for a vehicle includes: a light source configured to emit light; and a light guide body including a light entering portion disposed at one side of the light source and configured such that the light enters the light entering portion, a light exiting portion configured such that the light entering the light entering portion exits the light exiting portion, and a recessed region disposed between the light entering portion and the light exiting portion and having a shape recessed upward in a lower surface of the light guide body, in which the recessed region includes: a first surface formed in a region adjacent to the light entering portion; a second surface connected to the first surface through a first connection portion and extending toward the light exiting portion; and a third surface connected to the second surface through a second connection portion and extending toward the light exiting portion, and in which the second connection portion includes a curved connection portion.

According to the present disclosure, it is possible to prevent light blurring from occurring at the upper side of the cut-off line at the time of forming the low beam light distribution pattern and prevent light blindness due to the light blurring, which makes it possible to ensure the visual field of the pedestrian and the driver in front of the vehicle, thereby remarkably reducing a risk of an accident.

DETAILED DESCRIPTION

Figure 1:
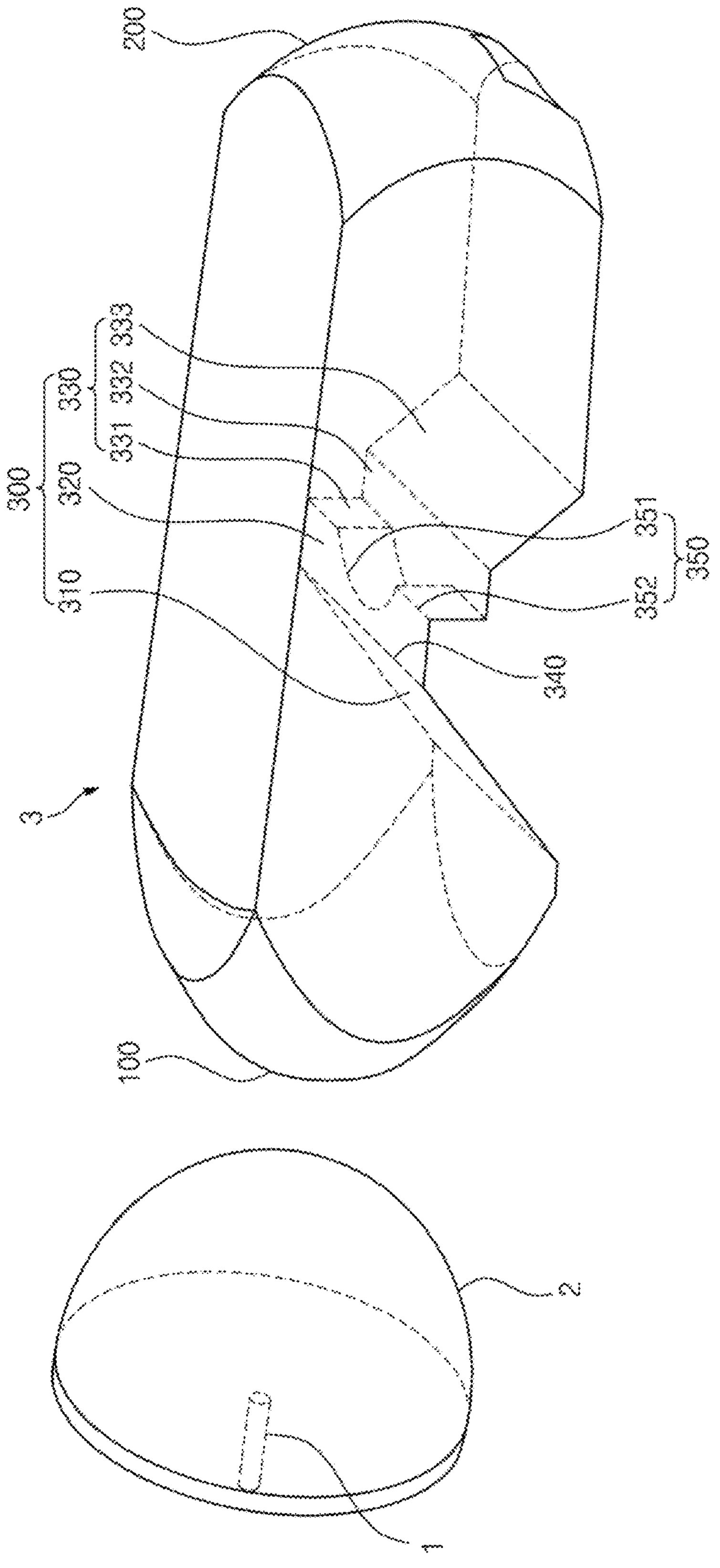
FIG. 1 is a perspective view illustrating a lamp for a vehicle according to an embodiment of the present disclosure.

Hereinafter, a lamp for a vehicle and a vehicle including the same according to the present disclosure will be described with reference to the drawings. Hereinafter, exemplary embodiments of the present disclosure will be described in detail with reference to the accompanying drawings so that those with ordinary skill in the art to which the present disclosure pertains may easily carry out the embodiments. However, the present disclosure may be implemented in various different ways and is not limited or restricted by the embodiments described herein.

A part irrelevant to the description will be omitted to clearly describe the present disclosure. Further, the specific descriptions of publicly known related technologies will be omitted when it is determined that the specific descriptions may unnecessarily obscure the subject matter of the present disclosure. In assigning reference numerals to constituent elements of the respective drawings in the present specification, the same or similar constituent elements will be designated by the same or similar reference numerals throughout the specification.

In addition, terms or words used in the specification and the claims should not be interpreted as being limited to a general or dictionary meaning and should be interpreted as a meaning and a concept which conform to the technical spirit of the present disclosure based on a principle that an inventor can appropriately define a concept of a term in order to describe his/her own invention by the best method.

Lamp for Vehicle

Figure 2:
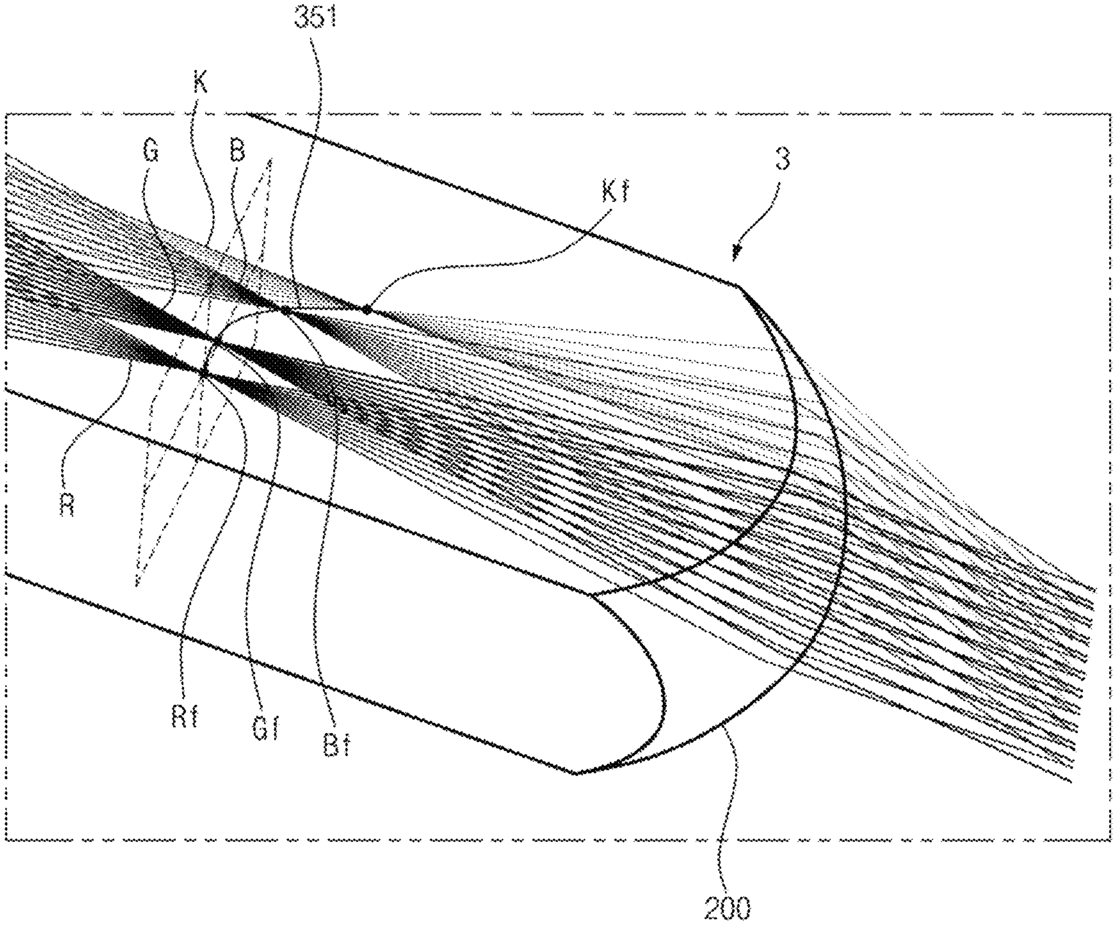
FIG. 2 is a view illustrating a state in which horizontal non-axial light beams are transmitted in a light guide body according to the embodiment of the present disclosure.

FIG. 1 is a perspective view illustrating a lamp for a vehicle according to an embodiment of the present disclosure. FIG. 2 is a view illustrating a state in which horizontal non-axial light beams are transmitted in a light guide body according to the embodiment of the present disclosure.

First, referring to FIG. 1, a lamp for a vehicle (hereinafter, referred to as a 'lamp') according to the present disclosure includes a light source 1 and a light guide body 3. The light source 1 is a device that emits light. For example, the light source 1 may be, but not necessarily limited to, an LED. The light emitted from the light source 1 passes through a collimator 2 and enters the light guide body 3. The collimator 2 may be configured to convert the light emitted from the light source 1 into parallel light and supply the parallel light to the light guide body 3. The above-mentioned light source 1 may be surrounded by the collimator 2.

The light guide body 3 may be a lens. The light guide body 3 may be made of a glass or plastic material. Because the light guide body 3 has a complicated shape, unlike a typical lens, as described below, the light guide body 3 may be made of a plastic material so that the light guide body 3 may be easily manufactured.

A structure of the light guide body 3 will be described with reference to FIG. 1. The light guide body 3 includes: a light entering portion 100 disposed at one side of the light source 1, provided to face the light source 1, and configured such that the light emitted from the light source 1 enters the light entering portion 100; and a light exiting portion 200 disposed at a side opposite to the light entering portion 100 of the light guide body 3 and configured such that the light entering the light entering portion 100 exits the light exiting portion 200.

The light entering portion 100 is a region in which the light emitted from the light source 1 and passing through the collimator 2 enters the light guide body 3. The light entering portion 100 is a region positioned at a rear side of the light guide body 3 and may have a curved shape convexly protruding toward the light source 1. In addition, the light exiting portion 200 is a region positioned at a front side of the light guide body 3 from which the light entering the light entering portion 100 exits. The light exiting portion 200 may have a curved shape protruding in a direction in which the light entering through the light entering portion 100 exits. That is, the light entering portion 100 and the light exiting portion 200 may be respectively disposed at the rear and front sides of the light guide body 3 and protrude in the opposite directions.

Meanwhile, the lamp according to the present disclosure may be configured to form a low beam light distribution pattern. To this end, as illustrated in FIG. 1, the light guide body 3 includes a recessed region 300 recessed upward in a lower surface and disposed between the light entering portion 100 and the light exiting portion 200.

The recessed region 300 will be described in detail with reference to FIG. 1. The recessed region 300 may include a first surface 310, a second surface 320, and a third surface 330. The first surface 310 is formed in a region relatively closer to the light entering portion 100 of the light guide body 3 than are regions of the second and third surfaces 320 and 330. The first surface 310 may be a surface serving as a shield that blocks a part of the entering light in order to form a low beam light distribution pattern. To this end, the first surface 310 may be subjected to a surface treatment so as to absorb or reflect the light reaching the first surface 310. Therefore, a part of the light entering the light entering portion 100 of the light guide body 3 may be blocked by the first surface 310 so as not to exit the light exiting portion 200.

The first surface 310 is formed in the lower surface of the light guide body 3. The first surface 310 may have a shape inclined upward in a direction from the light entering portion 100 to the light exiting portion 200. The first surface 310 may define a part of the recessed region 300. Therefore, the light reflected by the first surface 310 may not exit the light exiting portion 200 positioned at the front side of the light guide body 3.

Next, the second surface 320 may be a surface connected to the first surface 310, extending in the direction from the light entering portion 100 to the light exiting portion 200, and formed in parallel with an optical axis of the light exiting portion 200. That is, the second surface 320 may be a surface connected to the first surface 310, extending in the direction toward the light exiting portion 200, and configured to connect the first surface 310 and the third surface 330 to be described below.

As described above, according to the lamp according to the present disclosure, the recessed region 300 of the light guide body 3 includes the second surface 320, and the second surface 320 is configured as a surface extending from an end of the first surface 310 that serves as a shield. Therefore, the recessed region 300 may form the low beam light distribution pattern while reflecting the light reaching an upper portion of the second surface 320 so that the light is directed toward the light exiting portion 200. Therefore, it is possible to minimize a loss of light and improve luminous efficiency.

Figure 3:
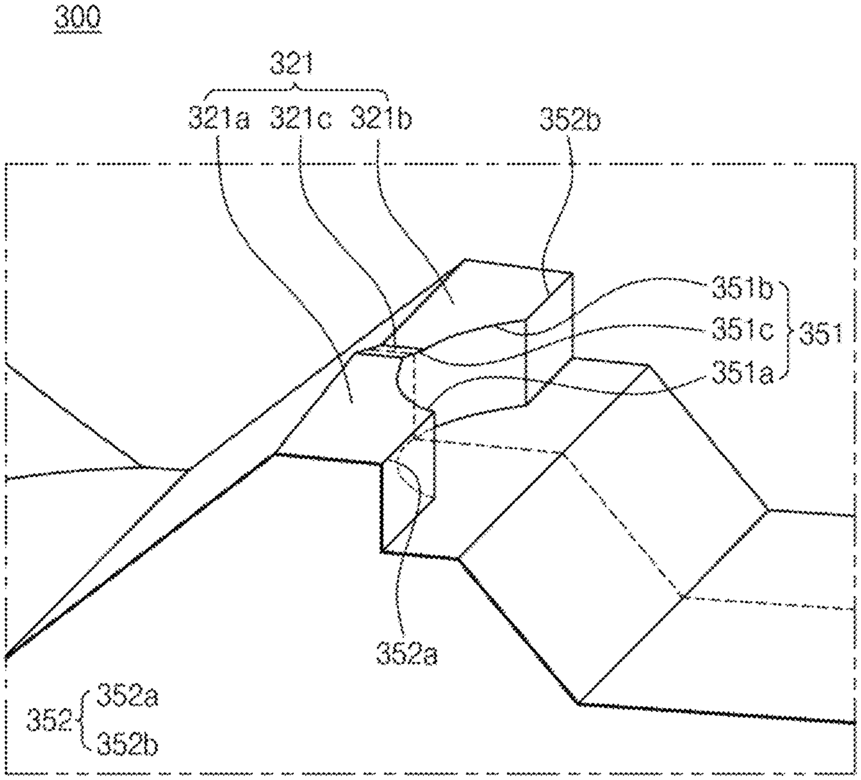
FIG. 3 is an enlarged perspective view of a recessed region of the light guide body according to the embodiment of the present disclosure.
Figure 4:
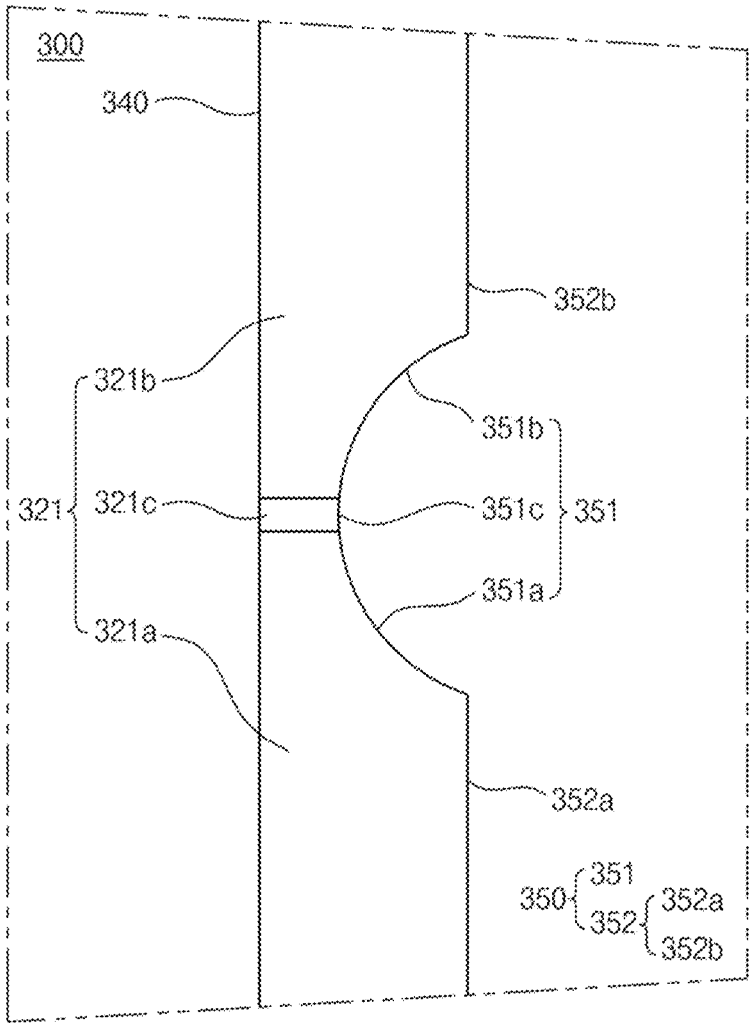
FIG. 4 is a top plan view illustrating the recessed region of the light guide body according to the embodiment of the present disclosure.
Figure 5:
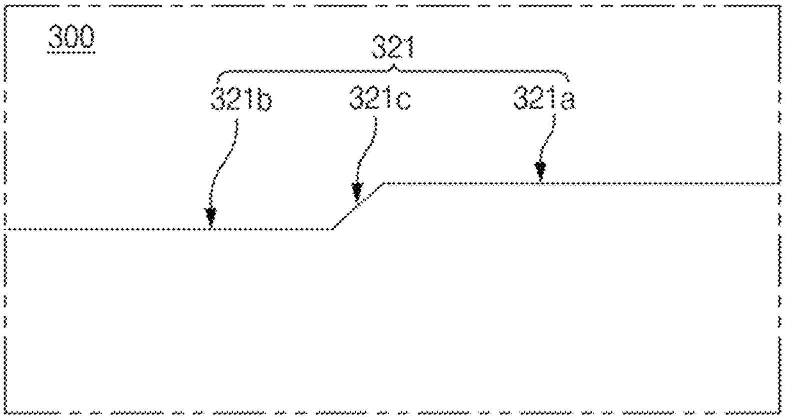
FIG. 5 is a view illustrating a cut-off portion of the light guide body according to the embodiment of the present disclosure when viewed in a direction from a light entering portion to a light exiting portion.

The second surface 320 may be connected to the first surface 310 through a first connection portion 340. That is, the first connection portion 340 may mean a line connecting the first surface 310 and the second surface 320. In particular, the first connection portion 340 may connect the first surface 310 and the second surface 320 at a position at which a focal point of the light entering portion 100 is formed. Meanwhile, as illustrated in FIGS. 3 to 5, the second surface 320 illustrated in FIG. 1 may further include a cut-off portion 321 having a shape corresponding to a cut-off line of the low beam light distribution pattern. The cut-off portion 321 will be described below in detail.

Next, referring to FIG. 1, the third surface 330 may be connected to the second surface 320 through a second connection portion 350 and extend toward the light exiting portion 200. That is, the second connection portion 350 may mean a line connecting the second surface 320 and the third surface 330. The second surface 320 may be understood as a surface defined by the first connection portion 340 and the second connection portion 350 and disposed between the first surface 310 and the third surface 330.

The second connection portion 350 according to the present disclosure may further include a curved connection portion 351 and straight connection portions 352 formed at two opposite sides of the curved connection portion 351. Hereinafter, the curved connection portion 351 will be described in detail.

First, light beams entering the light guide body 3 will be described with reference to FIG. 2. The light beams entering the light guide body 3 may be horizontal non-axial light beams. The horizontal non-axial light beams mean parallel light beams having angles with respect to the horizontal direction. For example, among the horizontal non-axial light beams, a red light beam R may be parallel to the optical axis, a green light beam G may have an angle of 5 degrees with respect to the optical axis, a blue light beam B may have an angle of 10 degrees with respect to the optical axis, and a black light beam K may have an angle of 20 degrees with respect to the optical axis. As described above, the horizontal non-axial light beams may have various angles with respect to the horizontal direction depending on the colors of the light beams. Therefore, positions of focal points Rf, Gf, Bf, and Kf for the respective colors may also be different from one another. That is, the focal points of the horizontal non-axial light beams are formed along a curved surface or curved line instead of being formed on a single plane or straight line.

As illustrated in FIG. 1, the second connection portion 350 according to the present disclosure may include the curved connection portion 351 having a predetermined curvature. Therefore, it is possible to form a low beam pattern by changing an angle of light that may cause light blurring, improve luminous efficiency, and prevent light blindness from being caused to a driver in an oncoming vehicle. In this case, as illustrated in FIG. 2, the predetermined curvature may mean a curvature of a shape corresponding to an imaginary line connecting the plurality of focal points Rf, Gf, Bf, and Kf formed for the respective colors R, G, B, and K of the horizontal non-axial light beams. The curved connection portion 351 may particularly be formed along the positions of the plurality of focal points Rf, Gf, Bf, and Kf.

In addition, the curved connection portion 351 may have a shape recessed in the direction from the light exiting portion 200 to the light entering portion 100. In this case, the recessed shape may mean a part of a circle or a part of an ellipse.

When viewed from above the light guide body 3, the second connection portion 350 may have the curved connection portion 351 formed at a central portion based on a leftward/rightward direction, and the straight connection portions 352 may be provided at two opposite sides of the curved connection portion 351 and formed symmetrically in the leftward/rightward direction with respect to the central portion of the light guide body 3.

Referring to FIG. 1, the third surface 330 may include a vertical surface 331, a horizontal surface 332, and an inclined surface 333. This configuration will be described in detail. First, the vertical surface 331 may be connected to the second surface 320 through the second connection portion 350, vertically extending downward from the second connection portion 350, and having a vertical cross-section corresponding in shape to the second connection portion 350. Therefore, the vertical surface 331 of the third surface 330 may also have a recessed surface corresponding to the recessed shape of the curved connection portion 351 when the second connection portion 350 includes the curved connection portion 351 and the straight connection portions 352 and the curved connection portion 351 has the shape recessed in the direction from the light exiting portion 200 to the light entering portion 100.

In addition, the horizontal surface 332 may be a surface connected to the vertical surface 331 and horizontally extending in the direction from the light entering portion 100 to the light exiting portion 200. The inclined surface 333 may be connected to the horizontal surface 332 and inclined downward in the direction from the light entering portion 100 to the light exiting portion 200.

Meanwhile, referring to FIGS. 1 and 3 to 5, the recessed region 300 may further include the cut-off portion 321 provided on the second surface 320 and having a stepped shape. The cut-off portion 321 may have the stepped shape formed in the leftward/rightward direction so that a low beam light distribution pattern formed by the lamp according to the present disclosure may have a cut-off line.

Hereinafter, the cut-off portion 321 will be described in detail with reference to FIGS. 1 and 3 to 5. FIG. 3 is an enlarged perspective view of the recessed region of the light guide body according to the embodiment of the present disclosure. FIG. 4 is a top plan view illustrating the recessed region of the light guide body according to the embodiment of the present disclosure. FIG. 5 is a view illustrating the cut-off portion of the light guide body according to the embodiment of the present disclosure when viewed in the direction from the light entering portion to the light exiting portion.

Based on the direction from the light entering portion 100 to the light exiting portion 200, the cut-off portion 321 may include: a lower cut-off portion **321*b* formed at one side based on the leftward/rightward direction; an upper cut-off portion 321*a* formed at the other side based on the leftward/rightward direction and disposed upward from the lower cut-off portion 321*b*; and a stepped cut-off portion 321*c* configured to connect the lower cut-off portion 321*b* and the upper cut-off portion 321*a*. In this case, one side may be a left side when viewed in the direction from the light entering portion 100 to the light exiting portion 200. The other side may be a right side when viewed in the direction from the light entering portion 100 to the light exiting portion 200**.

In addition, the upper cut-off portion **321*a* and the lower cut-off portion 321*b* are parallel to the optical axis, and the stepped cut-off portion 321*c* is inclined, such that the stepped cut-off portion 321*c* may connect the upper cut-off portion 321*a* and the lower cut-off portion 321*b* so that a stepped portion is formed between the upper cut-off portion 321*a* and the lower cut-off portion 321*b***.

When the cut-off portion 321 having the stepped shape is provided as described above, the first connection portion 340 configured to connect the first surface 310 and the second surface 320 may also have a stepped shape, and the second connection portion 350 configured to connect the second surface 320 and the third surface 330 may also have a stepped shape. The stepped shape of the second connection portion 350 will be described below.

The second connection portion 350 may include the curved connection portion 351 and the straight connection portions 352. Therefore, the curved connection portion 351 formed at the central portion of the second connection portion 350 based on the leftward/rightward direction may have the stepped shape. The curved connection portion 351 may include: an upper curved connection portion **351*a* formed in a section in which the upper cut-off portion 321*a* and the third surface 330 of the recessed region 300 meet together; and a lower curved connection portion 351*b* formed in a section in which the lower cut-off portion 321*b* and the third surface 330 meet together. In addition, the curved connection portion 351 may further include a stepped curved connection portion 351*c* formed in a section in which the stepped cut-off portion 321*c* and the third surface 330 of the recessed region 300** meet together.

Figure 6:
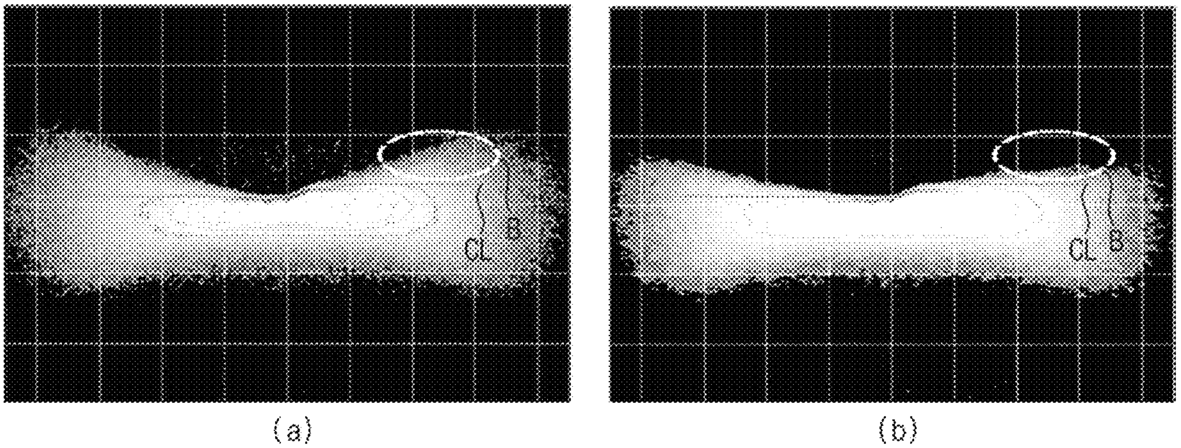
FIG. 6 is views for comparing a low beam light distribution pattern formed by a lamp for a vehicle in the related art and a low beam light distribution pattern formed by the lamp for a vehicle according to the embodiment of the present disclosure.

Hereinafter, the light distribution patterns implemented by the lamp for a vehicle depending on the presence or absence of the curved connection portion 351 will be described with reference to FIG. 6. In FIG. 6, figure (a) illustrates a low beam light distribution pattern formed by a lamp for a vehicle (hereinafter, a 'comparative example') having no curved connection portion 351, and figure (b) illustrates a low beam light distribution pattern formed by the lamp for a vehicle according to the present disclosure (hereinafter, referred to as 'the embodiment of the present disclosure') including the curved connection portion 351.

First, referring to the light distribution pattern formed by the comparative example illustrated in figure (a) of FIG. 6, it can be seen that light distribution patterns are formed at upper portions of left and right sides of a cut-off line CL. The light distribution pattern formed at the upper portion of the cut-off line CL may cause light blindness to a driver or pedestrian in front of the vehicle and hinder a visual field. In contrast, referring to the light distribution pattern formed according to the embodiment of the present disclosure illustrated in figure (b) of FIG. 6, it can be seen that no light distribution pattern is formed at upper portions of left and right sides of a cut-off line CL. In particular, it can be seen that no light distribution pattern is formed in region B, i.e., the upper portion of the right side of the cut-off line CL. As described above, the light distribution pattern formed according to the embodiment of the present disclosure may sufficiently ensure a forward visual field without hindering a visual field of a driver or pedestrian in front of the vehicle, thereby remarkably reducing a risk of an accident.

In addition, the straight connection portions 352 may include: an upper straight connection portion 352*a* formed in a section in which the upper cut-off portion 321*a* and the third surface 330 of the recessed region 300 meet together; and a lower straight connection portion 352*b* formed in a section in which the lower cut-off portion 321*b* and the third surface 330 meet together.

Vehicle

A vehicle according to the present disclosure includes a lamp for a vehicle (hereinafter, referred to as a 'lamp'). The lamp may be a lamp for forming a low beam light distribution pattern. Referring to FIG. 1, the lamp may include: the light source 1 configured to emit light; and the light guide body 3 including: the light entering portion 100 provided at one side of the light source 1 and configured such that light enters the light entering portion 100; the light exiting portion 200 from which the light entering the light entering portion 100 exits; and the recessed region 300 provided between the light entering portion 100 and the light exiting portion 200 and having a shape recessed upward in the lower surface of the light guide body 3. In addition, the recessed region 300 includes: the first surface 310 formed in the region adjacent to the light entering portion 100; the second surface 320 connected to the first surface 310 through the first connection portion 340 and extending toward the light exiting portion 200; and the third surface 330 connected to the second surface 320 through the second connection portion 350 and extending toward the light exiting portion 200. The second connection portion 350 includes the curved connection portion 351.

Meanwhile, the above-mentioned description of the lamp according to the present disclosure may also be equally applied to the vehicle according to the present disclosure.

Hereinafter, a lamp module according to another embodiment of the present disclosure and a lamp for a vehicle including the same will be described with reference to FIGS. 7 to 18.

Figure 7:
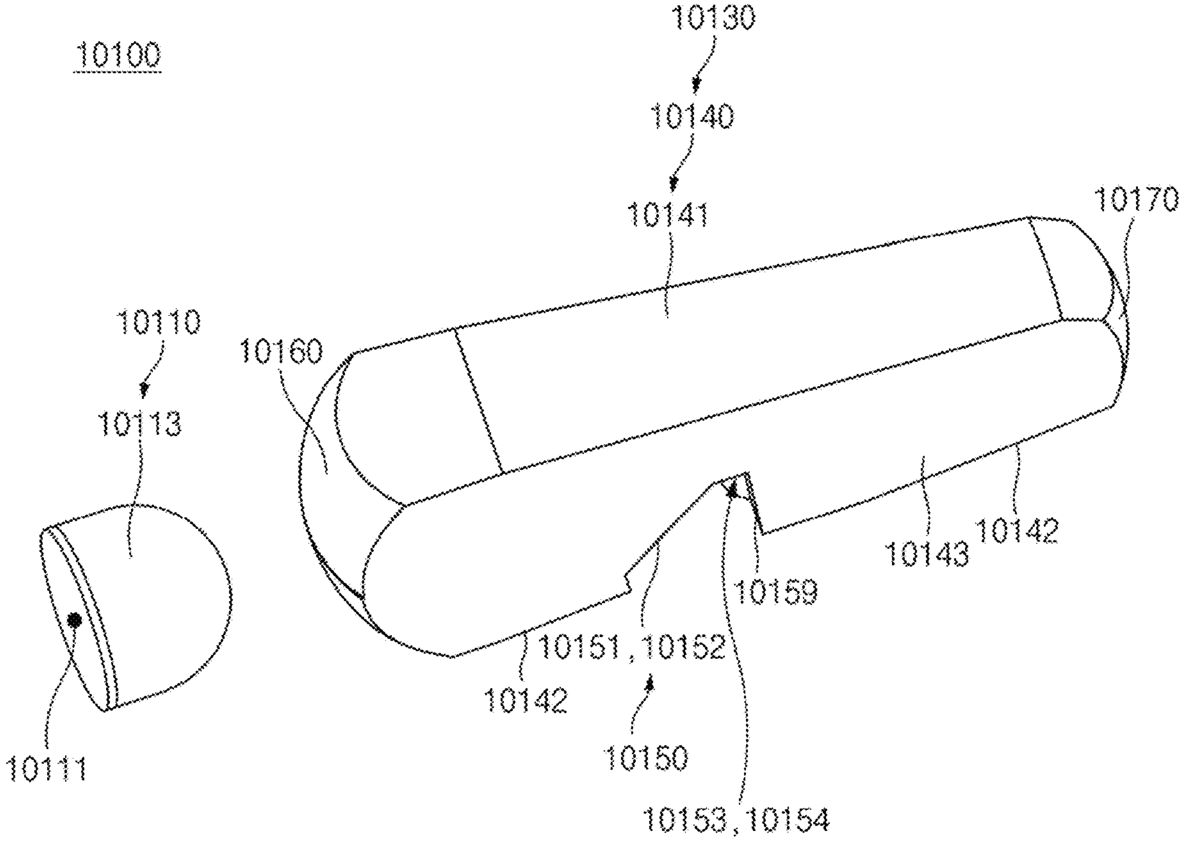
FIG. 7 is a perspective view illustrating a lamp module according to the embodiment of the present disclosure.
Figure 8:
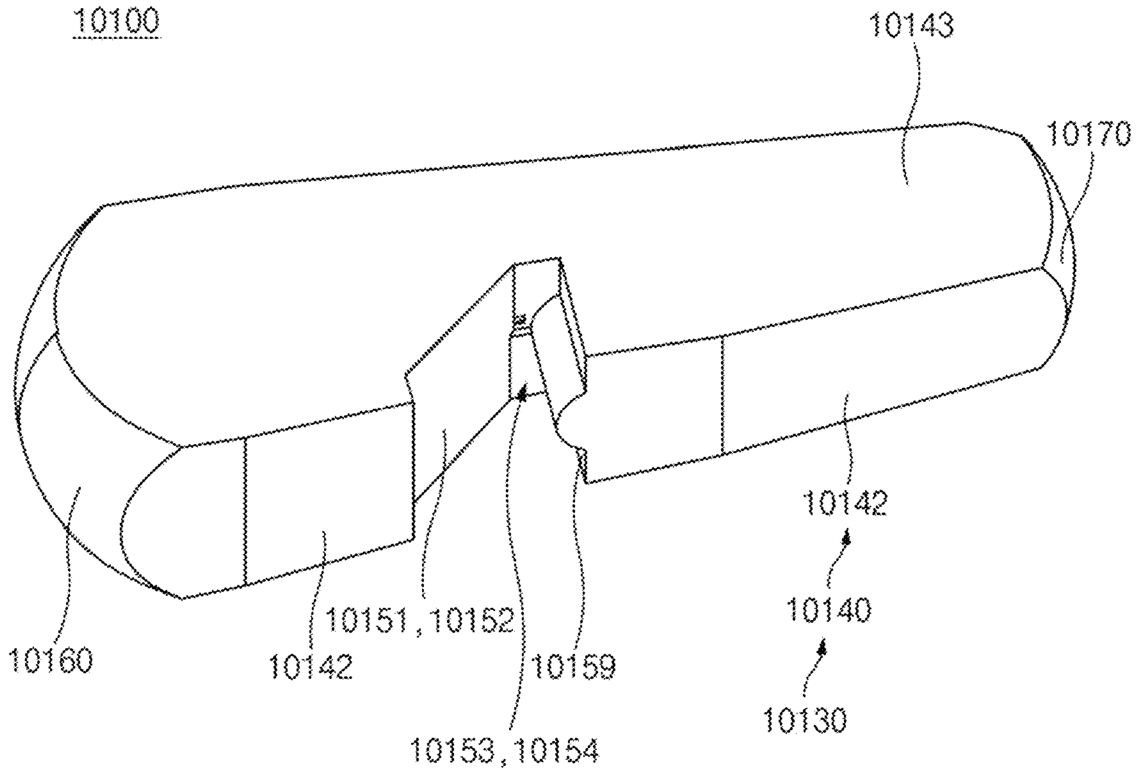
FIG. 8 is a perspective view illustrating the lamp module according to the embodiment of the present disclosure when viewed from below.
Figure 9:
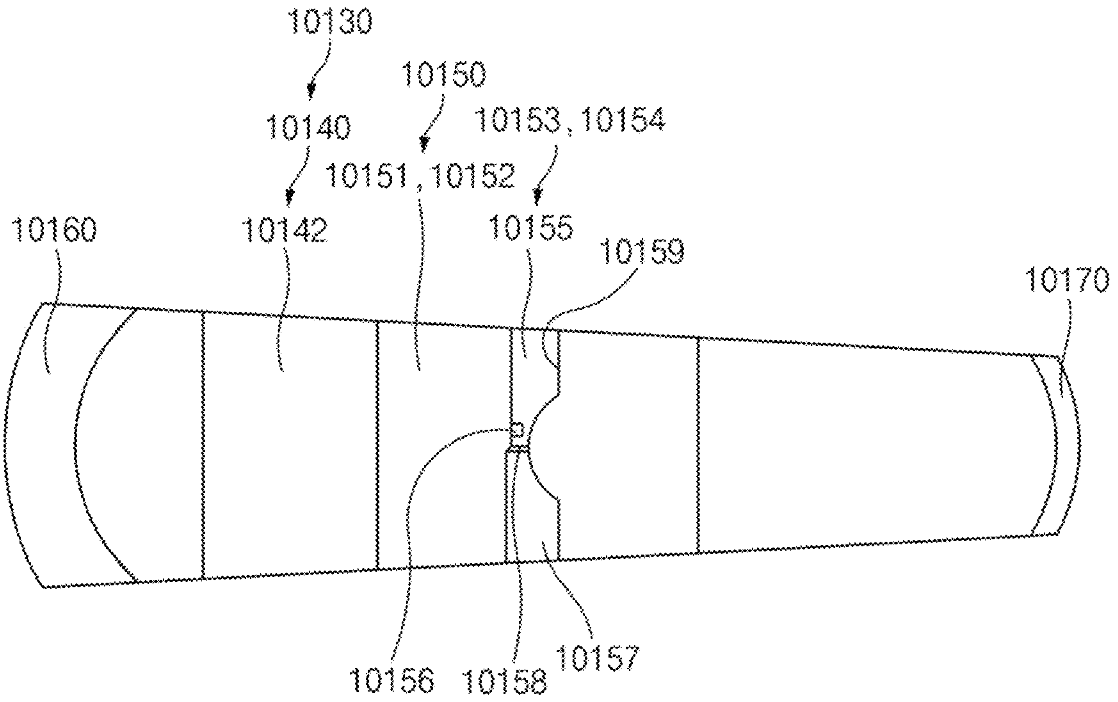
FIG. 9 is a bottom plan view illustrating the lamp module according to the embodiment of the present disclosure when viewed from below.
Figure 10:
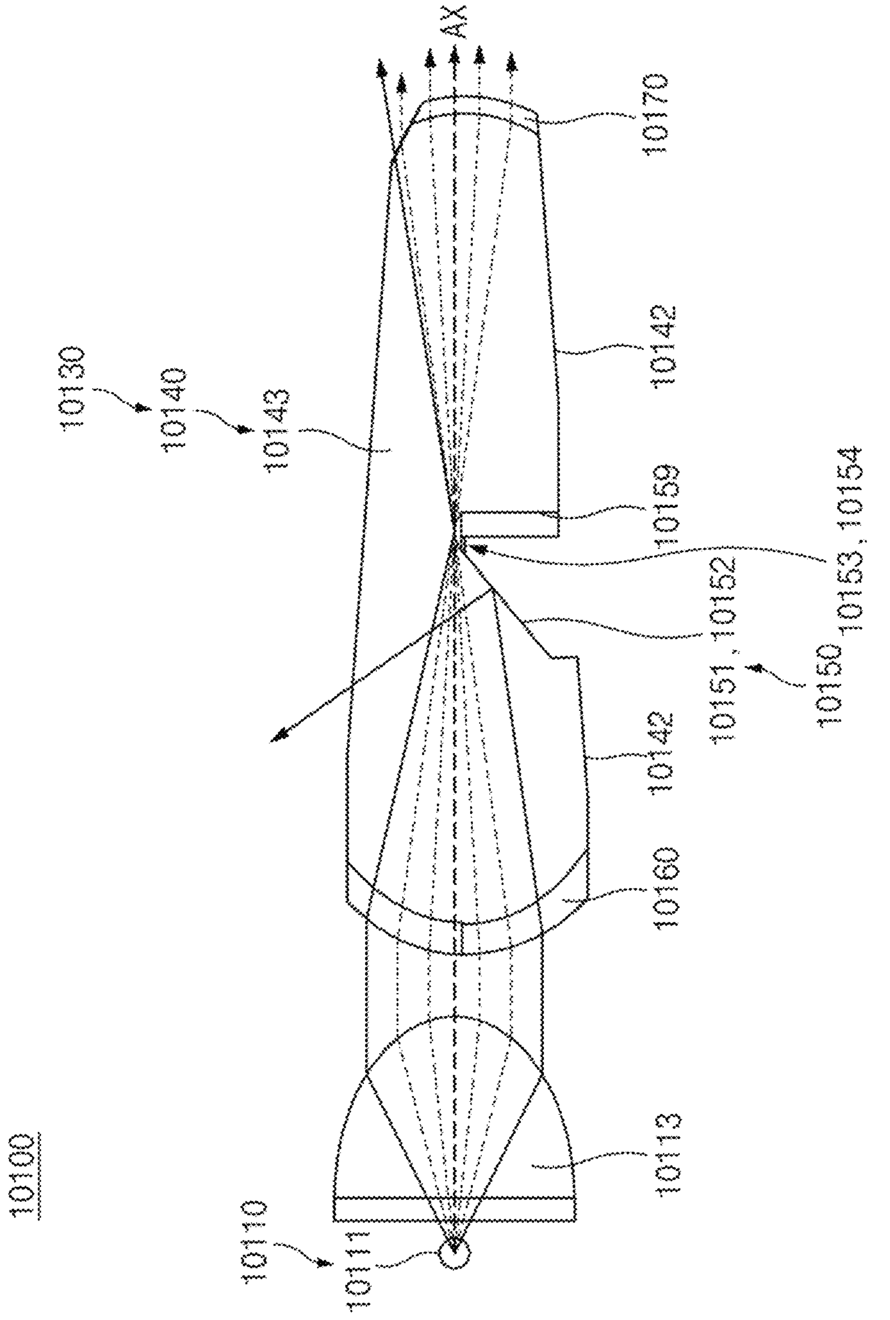
FIG. 10 is a view illustrating the lamp module according to the embodiment of the present disclosure when viewed laterally for explaining a route of light emitted from a light source.
Figure 11:
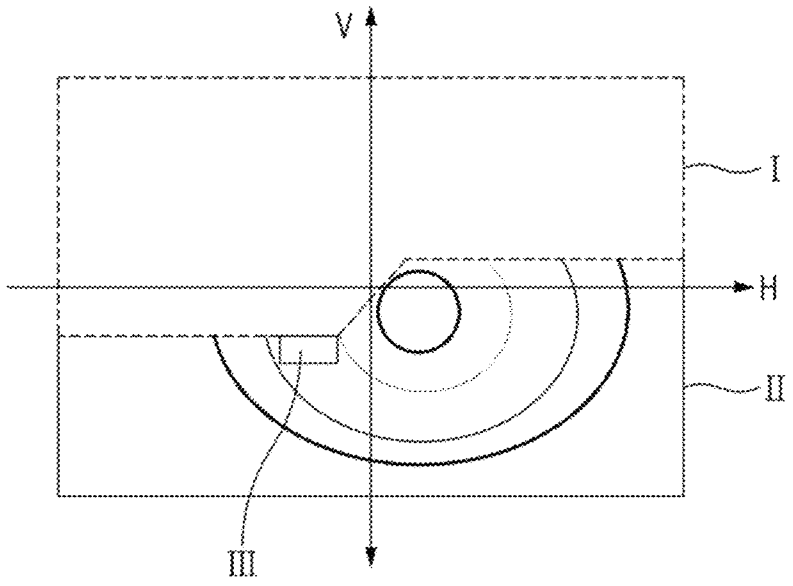
FIG. 11 is a view illustrating a light distribution pattern formed by the lamp module according to the embodiment of the present disclosure.
Figure 12:
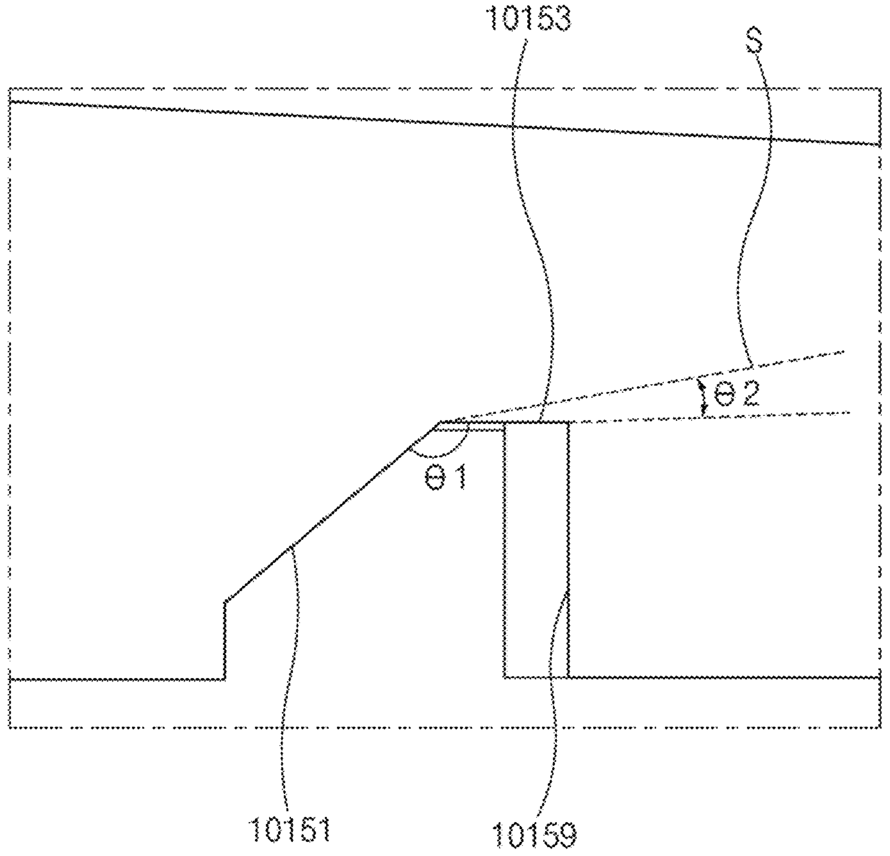
FIG. 12 is an enlarged view of a part of a lateral side of the lamp module according to the embodiment of the present disclosure.
Figure 13:
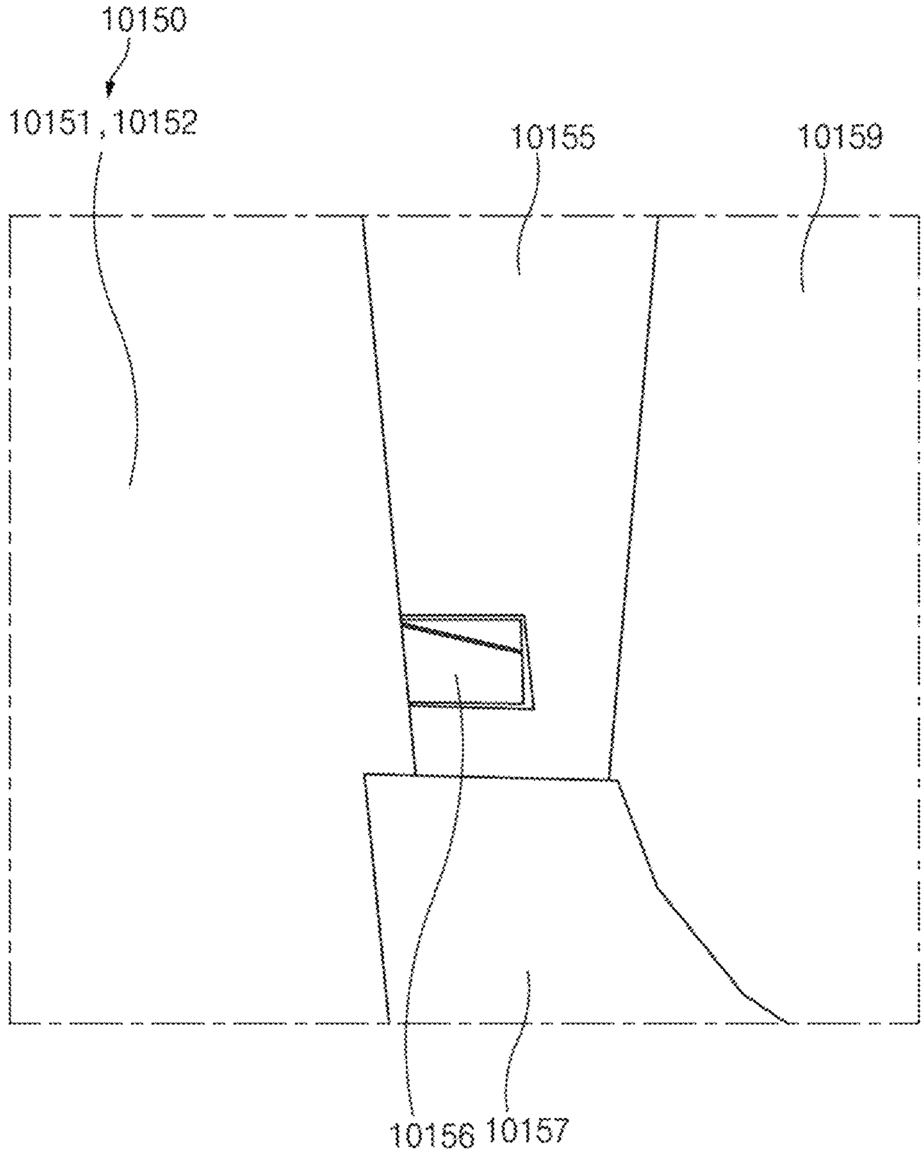
FIG. 13 is an enlarged perspective view of a part of the lamp module according to the embodiment of the present disclosure, when viewed from below, for explaining a recessed groove.
Figure 14:
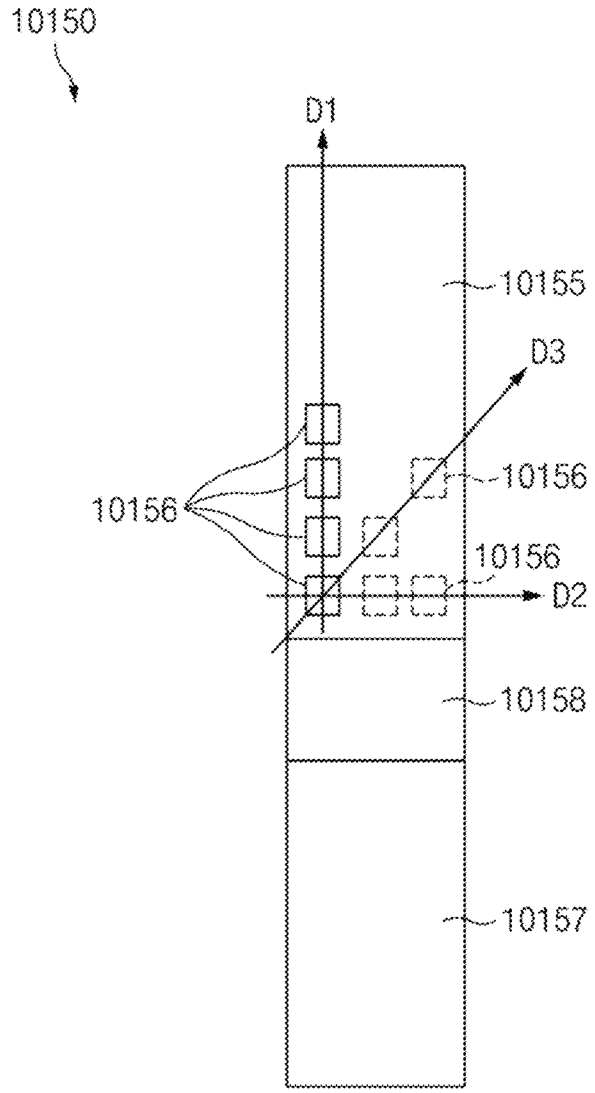
FIG. 14 is a view illustrating a second surface of the lamp module according to the embodiment of the present disclosure.

FIG. 7 is a perspective view illustrating the lamp module according to the embodiment of the present disclosure, FIG. 8 is a perspective view illustrating the lamp module according to the embodiment of the present disclosure when viewed from below, FIG. 9 is a bottom plan view illustrating the lamp module according to the embodiment of the present disclosure when viewed from below, FIG. 10 is a view illustrating the lamp module according to the embodiment of the present disclosure when viewed laterally for explaining a route of light emitted from a light source, FIG. 11 is a view illustrating a light distribution pattern formed by the lamp module according to the embodiment of the present disclosure, FIG. 12 is an enlarged view of a part of a lateral side of the lamp module according to the embodiment of the present disclosure, FIG. 13 is an enlarged perspective view of a part of the lamp module according to the embodiment of the present disclosure when viewed from below for explaining a recessed groove, FIG. 14 is a view illustrating a second surface of the lamp module according to the embodiment of the present disclosure, and FIGS. 15A, 15B, and 15C are views illustrating modified examples of the recessed groove.

Referring to FIGS. 7 to 15C, a lamp module 10100 according to the embodiment of the present disclosure includes a light source unit 10110 and a lens structure 10130.

The light source unit 10110 is configured to generate and emit light. In this case, an element or device capable of emitting light may be used as the light source unit 10110. The light source unit 10110 may include a light source 10111 that generates light. For example, the light source 10111 may be a light-emitting diode (hereinafter, referred to as an 'LED'). However, the light source 10111 is not limited to the LED.

For example, the light source unit 10110 may be configured to emit parallel light forward toward the lens structure 10130. Specifically, the light source unit 10110 may further include a collimator 10113. The collimator 10113 is disposed in the direction toward the lens structure 10130 of the light source 10111. The collimator 10113 may be configured to convert the light emitted from the light source 10111 into parallel light parallel to an optical axis AX of the lens structure 10130 and allow the parallel light to enter the lens structure 10130. However, the configuration of the light source unit 10110 is not limited to the above-mentioned configuration. The light source unit 10110 may be variously modified as long as the light source unit 10110 may allow the light to enter the lens structure 10130.

The lens structure 10130 is disposed forward of the light source unit 10110. The lens structure 10130 is configured to form a predetermined beam pattern by transmitting, forward, the light emitted from the light source unit 10110. In the present specification, a direction in which the light is emitted from the lens structure 10130 is referred to as a forward direction, and a direction opposite to the forward direction is referred to as a rearward direction.

The lens structure 10130 includes a recessed portion 10150 having a shape recessed toward a central region of the lens structure 10130 based on an upward/downward direction.

In this case, the recessed portion 10150 includes: a light blocking region configured to prevent the light, which is emitted from the light source unit 10110 and reaches the recessed portion 10150, from exiting forward; and a light reflection region configured to reflect a part of the light reaching the recessed portion 10150 and allow the light to exit forward.

Specifically, the recessed portion 10150 is a recessed region formed in the lens structure 10130 to allow the light exiting the lens structure 10130 to form a predetermined pattern (e.g., a low beam pattern). That is, the embodiment of the present disclosure implements a predetermined pattern by means of the recessed portion 10150 formed by deforming a part of the shape of the lens structure 10130 without a separate shield member for implementing a predetermined light distribution pattern.

The recessed portion 10150 may have a shape recessed toward the central region of the lens structure 10130 based on the upward/downward direction. That is, the recessed portion 10150 may have a shape recessed toward the central region of the lens structure 10130 based on a direction perpendicular to the direction of the optical axis AX. Further, the recessed portion 10150 may have the light blocking region and the light reflection region.

The light blocking region may be configured to block a part of the light reaching the lens structure 10130. The light blocking region of the recessed portion 10150 may prevent the light, which exits the light source unit 10110 and enters the lens structure 10130, from exiting forward.

The light reflection region is a region extending from the light blocking region. The light reflection region is a region that reflects a part of the light reaching the lens structure 10130 and allows the light to exit forward. To this end, the light reflection region and the light blocking region may be formed at different angles. A loss of light may occur while the light blocking region blocks the light reaching the recessed portion 10150. The light reflection region is provided to prevent a loss of light. The light reflection region may reflect a part of the light reaching the recessed portion 10150 and allow the light to exit forward, thereby improving luminous efficiency.

Referring to FIGS. 7 to 10, the recessed portion 10150 may include a first reflective layer 10152 and a second reflective layer 10154.

The first reflective layer 10152 may be formed in the light blocking region and reflect the light which is emitted from the light source unit 10110 and reaches the recessed portion 10150. That is, the first reflective layer 10152 may reflect a part of the light entering the recessed portion 10150, thereby preventing the light from exiting forward.

The second reflective layer 10154 is formed in the light reflection region and extends at a predetermined angle with respect to the first reflective layer 10152. The second reflective layer 10154 may reflect a part of the light, which is emitted from the light source unit 10110 and reaches the recessed portion 10150, thereby allowing the light to exit toward the front side of the lens structure 10130.

The lens structure 10130 may include a body portion 10140, a light entering surface 10160, and a light exiting surface 10170.

The body portion 10140 may have the recessed portion 10150. Specifically, the body portion 10140 may define a body of the lens structure 10130 and be made of a material that transmits the entering light. The body portion 10140 may include: an upper surface 10141 configured to connect the light entering surface 10160 and the light exiting surface 10170; a lower surface 10142 disposed to face the upper surface 10141 in the upward/downward direction; and lateral surfaces 10143 disposed between the upper surface 10141 and the lower surface 10142. In this case, the light emitted from the light source 10111 may not be totally reflected by the upper surface 10141, the lower surface 10142, and the lateral surfaces 10143 of the body portion 10140. The recessed portion 10150 may have a shape recessed from the lower surface 10142 of the body portion 10140 toward the central region.

The light entering surface 10160 is formed at a side of the body portion 10140 where the light enters. The light entering surface 10160 may allow the light emitted from the light source unit 10110 to enter the body portion 10140. Further, the light exiting surface 10170 is formed at a side of the body portion 10140 where the light exits. The light exiting surface 10170 may allow the light entering the body portion 10140 to exit forward. In this case, the body portion 10140, the light entering surface 10160, and the light exiting surface 10170 may be integrated.

Specifically, the light entering surface 10160 may be formed at a side of the body portion 10140 directed toward the rear side of the body portion 10140, and the light exiting surface 10170 may be formed at a side of the body portion 10140 directed toward the front side of the body portion 10140. The light entering surface 10160 may be configured to collect the light, which is emitted from the light source unit 10110, into the body portion 10140. For example, the light entering surface 10160 may be provided in the form of a convex lens curved toward the light source unit 10110.

The light exiting surface 10170 may be configured to allow the light, which is transmitted through the body portion 10140 of the lens structure 10130, to exit forward. For example, the light exiting surface 10170 may have a shape curved forward. The light exiting surface 10170 may be provided in the form of an aspherical lens. However, the shape of the light exiting surface 10170 is not limited to the shape of the aspherical lens, and various lens shapes may be applied.

For example, the optical axis AX of the light exiting surface 10170 and the optical axis AX of the light entering surface 10160 may be identical to each other. In the embodiment of the present disclosure, the optical axis AX of the lens structure 10130 means the optical axis AX of the light exiting surface 10170 or the light entering surface 10160.

The light emitted from the light source 10111 is converted into the parallel light by the collimator 10113, and the parallel light enters the light entering surface 10160. The entering light may be collected into the body portion 10140 by the light entering surface 10160. Specifically, the light entering surface 10160 may collect the light, which enters from the light source unit 10110, to a portion adjacent to the focal point of the light exiting surface 10170. In this case, the light source 10111, the collimator 10113, and the lens structure may be sequentially arranged in the direction of the optical axis AX of the lens structure.

For example, a size of the light entering surface 10160 in the upward/downward direction may be larger than a size of the light exiting surface 10170 in the upward/downward direction or equal to the size of the light exiting surface 10170 in the upward/downward direction. Specifically, because the light exiting surface 10170 is a portion exposed to the outside, the size of the light exiting surface 10170 is restricted by design of the lamp or regulations related to the lamp. However, because the light entering surface 10160 is disposed inside a vehicle body without being exposed to the outside, the size of the light entering surface 10160 is not restricted. Therefore, the light entering surface 10160 may be equal in size to the light exiting surface 10170 or relatively larger in size than the light exiting surface 10170. Therefore, the light emitted from the light source unit 10110 may be maximally collected, thereby minimizing a loss of light.

Meanwhile, the recessed portion 10150 may include a first surface 10151, a second surface 10153, and a third surface 10159.

The first surface 10151 may be disposed adjacent to the light entering surface 10160, extend from the lower surface 10142 of the body portion 10140, and define the first reflective layer 10152. Further, the second surface 10153 may extend from an upper end of the first surface 10151 toward the light exiting surface 10170 and define the second reflective layer 10154. In addition, the third surface 10159 may extend from the second surface 10153 and be disposed adjacent to the light exiting surface 10170.

In this case, the first reflective layer 10152 and the second reflective layer 10154 may be respectively formed on the first surface 10151 and the second surface 10153 by depositing a material capable of reflecting light.

For example, the first reflective layer 10152 and the second reflective layer 10154 may be respectively formed on the first surface 10151 and the second surface 10153 by depositing an aluminum material. In this case, the third surface 10159 is a portion for connecting the second surface 10153 and a portion of the lower surface 10142 disposed adjacent to the light exiting surface 10170. However, the material and the method of forming the first reflective layer 10152 and the second reflective layer 10154 are not limited thereto. Various materials and methods may be applied as long as it is possible to reflect light.

Meanwhile, the first surface 10151 may be inclined upward in a direction from the lower surface 10142 of the body portion 10140 toward the second surface 10153. That is, the first surface 10151 may be inclined downward from an end of the second surface 10153 adjacent to the light entering surface 10160 in the direction toward the light source unit 10110.

In this case, an inclination angle of the first surface 10151 may be an angle that allows the light reaching the first surface 10151 to be reflected by the first reflective layer 10152 and propagate to a region except for the light exiting surface 10170. Therefore, it is possible to prevent the light reaching the first reflective layer 10152 from exiting. The first reflective layer 10152 may block the light entering a lower side of the second reflective layer 10154 (or the second surface 10153).

Further, the third surface 10159 may be inclined more steeply than the first surface 10151. For example, the third surface 10159 may vertically extend downward from an end of the second surface 10153 adjacent to the light exiting surface 10170. The third surface 10159 is a portion for connecting the second surface 10153 and the lower surface 10142 of the body portion 10140. The third surface 10159 is not subjected to a separate treatment such as coating. The optical characteristics according to the present disclosure is not limited by the shape of the third surface 10159.

The second surface 10153 extends from the upper end of the first surface 10151 and is provided at the position corresponding to the focal point of the light exiting surface 10170. The second surface 10153 may be configured such that a cut-off line of a low beam pattern is formed by the second reflective layer 10154.

Specifically, the second surface 10153 may extend from the upper end of the first surface 10151 toward the light exiting surface 10170 and be provided at the position corresponding to the focal point of the light exiting surface 10170. For example, the end of the second surface 10153 adjacent to the light entering surface 10160 may be disposed on the focal point of the light exiting surface 10170. The lamp module according to the present disclosure may implement a low beam pattern of a headlamp. The second surface 10153 and the second reflective layer 10154 may form a cut-off line of a low beam pattern (see FIG. 11).

For reference, the cut-off line refers to a boundary line (contrast limit line) on which contrast is remarkably changed when the light emitted from the lamp module is projected on a light distribution screen. The cut-off line means an upper boundary line of the low beam pattern. In this case, the shape of the second surface 10153 is not limited, and the second surface 10153 may be variously formed in accordance with design specifications for forming the low beam pattern. In the light distribution pattern illustrated in FIG. 11, region I means a region in which light is blocked by the first reflective layer, region II means a region in which light exits through the light exiting surface, and region III means a region in which light is blocked by a recessed groove to be described below.

Meanwhile, for example, the second surface 10153 may be disposed at an obtuse angle with respect to the first surface 10151. Specifically, the first surface 10151 may be inclined downward in the direction from the second surface 10153 toward the light source unit 10110, and the second surface 10153 extends in the direction from the light entering surface 10160 to the light exiting surface 10170, such that an angle 61 defined between the first surface 10151 and the second surface 10153 may be an obtuse angle (see FIG. 12).

In addition, for example, assuming that a surface extending from the upper end of the first surface 10151 in parallel with the optical axis AX of the lens structure 10130 is a horizontal reference surface S, the second surface 10153 may be inclined at a predetermined angle with respect to the horizontal reference surface S (see FIG. 12).

For example, an angle 62 defined between the second surface 10153 and the horizontal reference surface S may be about 10 degrees. For example, the second surface 10153 is inclined at an angle of about 10 degrees with respect to the horizontal reference surface S. The second surface 10153 may be inclined downward toward the third surface 10159 from the upper end of the first surface 10151. Therefore, the amount of light, which is reflected by the second reflective layer 10154 and exits through the light exiting surface 10170, may increase, thereby increasing efficiency. However, the inclination angle of the second surface 10153 is not limited thereto. For example, the second surface 10153 may be formed in parallel with the horizontal reference surface.

Meanwhile, a recessed groove 10156 may be formed in the second surface 10153. The recessed groove 10156 may be formed to be concave upward in the second surface 10153 so as to block a part of the light entering an upper side of the second surface 10153. In this case, like other portions of the second surface 10153, the recessed groove 10156 may be coated with a reflective material such as aluminum. A part of the light reaching the second surface 10153 may not exit the light exiting surface 10170 by being blocked by the recessed groove 10156.

Referring to FIGS. 8, 9, and 13, the second surface 10153 may include an upper surface 10155, a lower surface 10157, and a stepped surface 10158. The lower surface 10157 may be provided at one side of the upper surface 10155 based on the leftward/rightward direction. The lower surface 10157 may be stepped from the upper surface 10155 and disposed at a height lower than a height of the upper surface 10155. Further, the stepped surface 10158 may connect the upper surface 10155 and the lower surface 10157 and be inclined.

Specifically, the upper surface 10155 and the lower surface 10157 may be provided on the second surface 10153 and arranged in the direction perpendicular to the optical axis AX. The upper surface 10155 and the lower surface 10157 may be disposed at different heights. The second reflective layer 10154 may be formed on the upper surface 10155, the lower surface 10157, and the stepped surface 10158. The cut-off line of the low beam pattern may be formed by the shape of the upper surface 10155, the shape of the lower surface 10157, and the shape of the stepped surface 10158.

In this case, the recessed groove 10156 may be formed in the upper surface 10155 (see FIGS. 9, 13, and 14).

Specifically, the recessed groove 10156 is a portion that reflects a part of the light reaching the second surface 10153 so that a part of the light does not exit through the light exiting surface 10170. The recessed groove 10156 may be formed in the upper surface 10155 and have a shape that may change a propagation route of the light. The shape and size of the recessed groove 10156 and the number of recessed grooves 10156 are not limited but may be variously changed in accordance with low beam design specifications of the applicable lamp module.

For example, the position and size of the recessed groove 10156 may be determined in consideration of a position of an oncoming vehicle when the vehicle travels. The light, which is to be directed toward a location at which an oncoming vehicle is positioned, is blocked by the recessed groove 10156 when the low beam pattern is formed at a location in front of the vehicle by the lamp module. Therefore, it is possible to prevent light blindness of the driver in the oncoming vehicle (see FIG. 11).

Therefore, the lamp module according to the present disclosure includes the second surface 10153 (the second reflective layer 10154) provided in the recessed portion 10150, such that the amount of light may be increased, and the minimum brightness of the low beam pattern required by the regulations may be satisfied, thereby ensuring a visual field of the driver. Further, the recessed groove 10156 may be formed in the second surface 10153, thereby minimizing light blindness caused to the driver in the oncoming vehicle.

Figure 15:
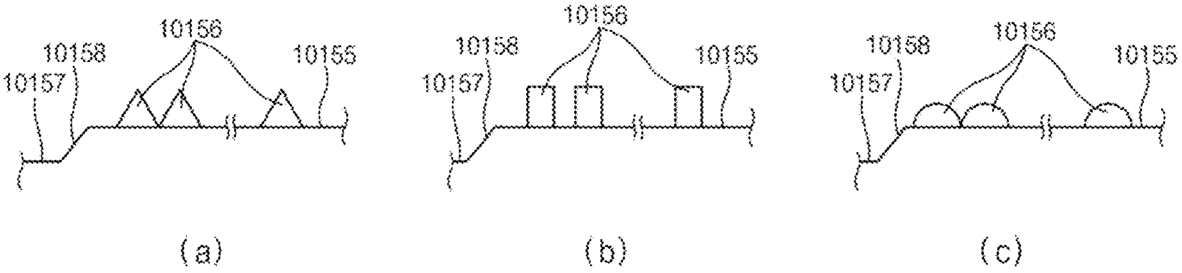
FIG. 15 is views illustrating modified examples of the recessed groove.

A single recessed groove 10156 or a plurality of recessed grooves 10156 may be provided. For example, as illustrated in FIGS. 9, 10, 11, and 13, the single recessed groove 10156 may be provided. As illustrated in FIGS. 14 and 15, the plurality of recessed grooves 10156 may be provided.

Hereinafter, a direction provided to the optical axis AX on the upper surface 10155 is referred to as a first direction D1, a direction provided to the first direction D1 on the upper surface 10155 is referred to as a second direction D2, and a direction inclined with respect to the first direction D1 or the second direction D2 on the upper surface 10155 is referred to as an oblique direction D3.

In this case, referring to FIG. 14, the plurality of recessed grooves 10156 may be provided. The plurality of recessed grooves 10156 may be arranged in any one of the first direction D1 and the second direction D2. In addition, for example, the plurality of recessed grooves 10156 may be disposed on the upper surface 10155 and arranged in the direction D3 oblique to the first direction D1. That is, the plurality of recessed grooves 10156 may be arranged in any one of the first direction D1, the second direction D2, and the oblique direction D3. Alternatively, the plurality of recessed grooves 10156 may be complexly in the first direction D1, the second direction D2, and the oblique direction D3.

In addition, a cross-sectional shape of the recessed groove 10156, which is perpendicular to the upper surface 10155 and perpendicular to the optical axis AX, may be a triangular shape (see figure (a) of FIG. 15), a quadrangular shape (see figure (b) of FIG. 15), and a semicircular shape (see figure (c) FIG. 15). That is, a cross-sectional shape made by cutting the recessed groove 10156 in a direction being perpendicular to the upper surface 10155 and extending in the first direction D1 may be any one of a triangular shape, a quadrangular shape, and a semicircular shape.

However, the shape of the recessed groove 10156 is not limited thereto but may be variously changed in accordance with design specifications of the lamp module. In addition, when the plurality of recessed grooves 10156 is provided, two or more shapes of the recessed grooves 10156 may be combined to implement complex shapes.

Figure 16:
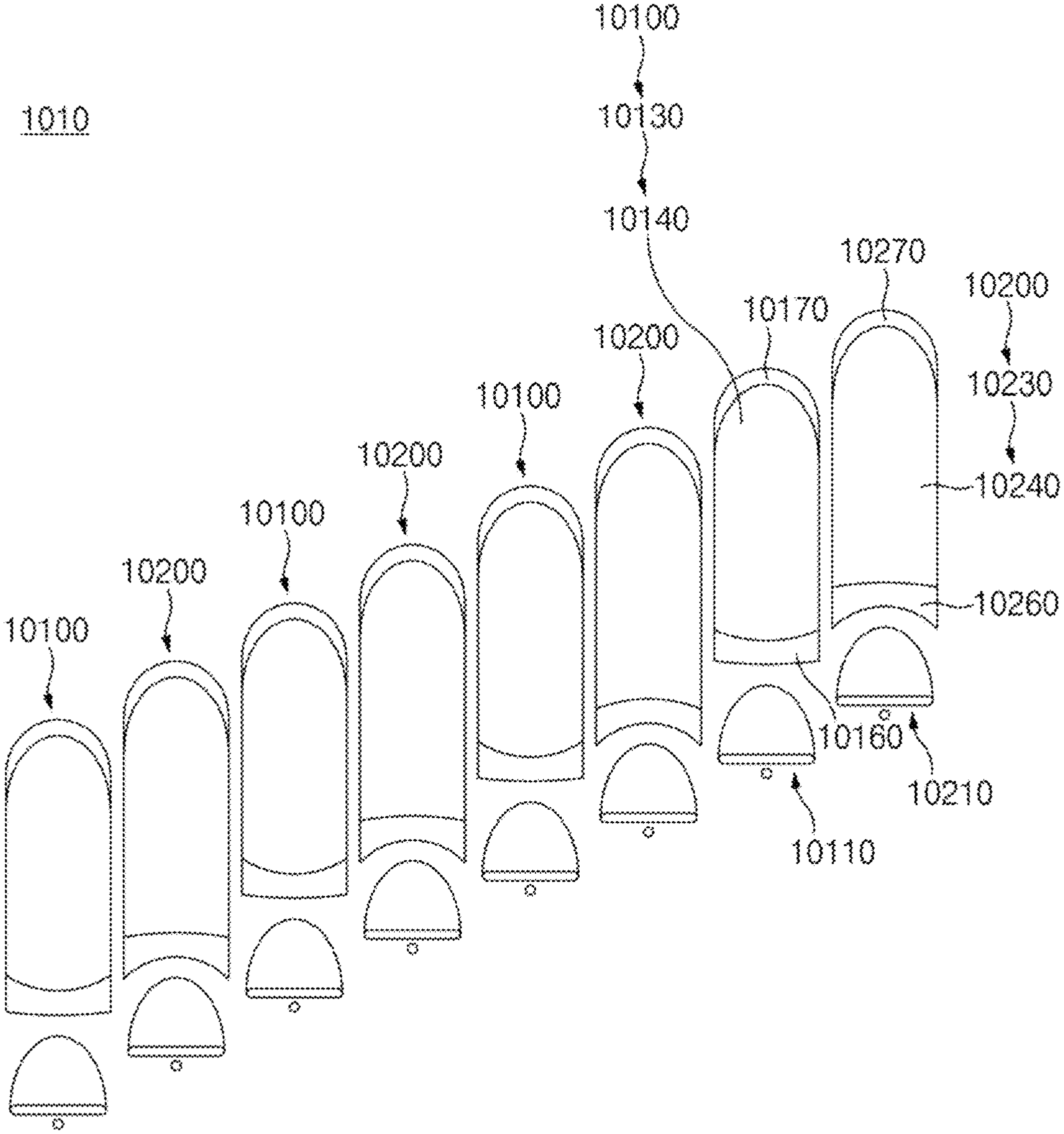
FIG. 16 is a top plan view illustrating the lamp for a vehicle according to the embodiment of the present disclosure.

Meanwhile, the lamp for a vehicle according to the present disclosure will be described below with reference to FIGS. 16 to 18. FIG. 16 is a top plan view illustrating the lamp for a vehicle according to the embodiment of the present disclosure, FIG. 17 is a bottom plan view illustrating a lower side of a first lamp module 10100 according to the embodiment of the present disclosure, and FIG. 18 is a bottom plan view illustrating a lower side of a second lamp module 10200 according to the embodiment of the present disclosure.

Figure 17:
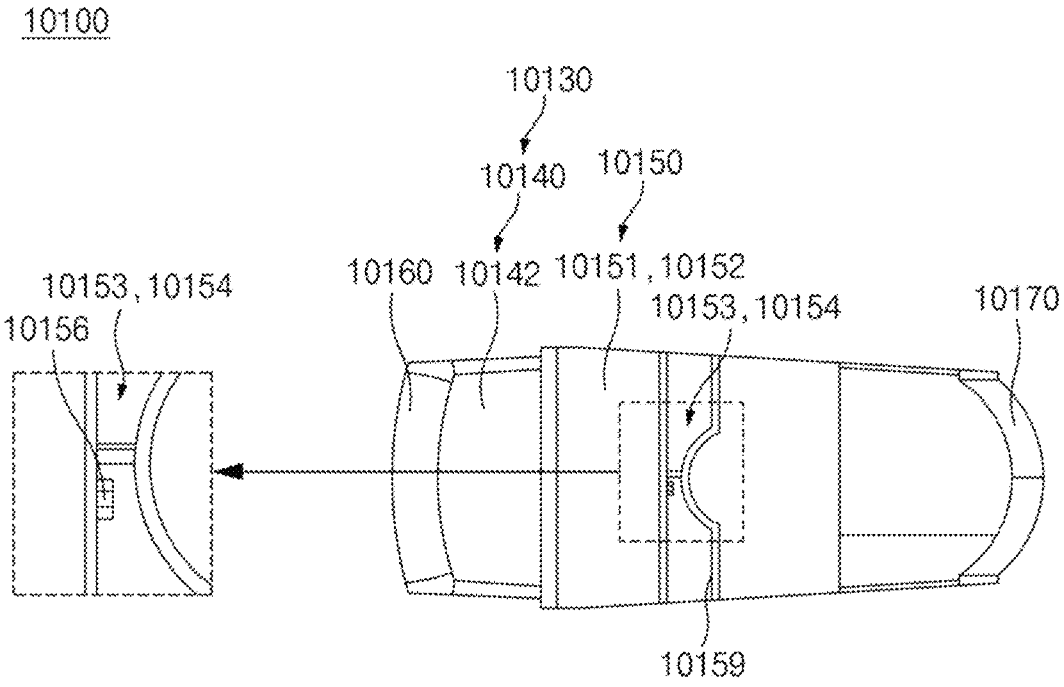
FIG. 17 is a bottom plan view illustrating a lower side of a first lamp module according to the embodiment of the present disclosure.
Figure 18:
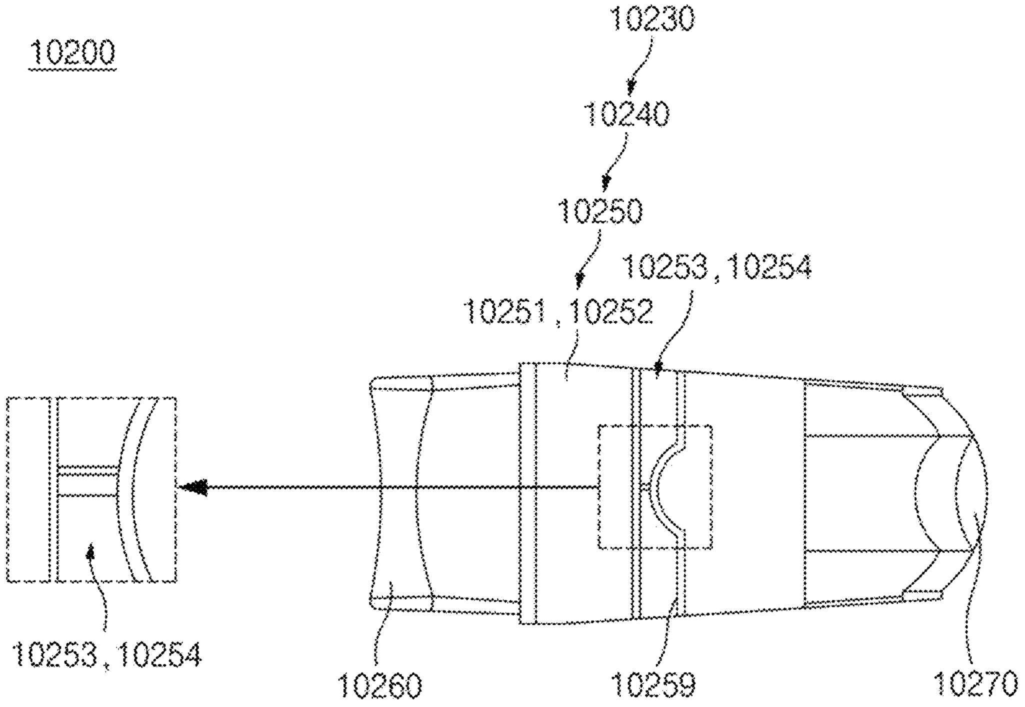
FIG. 18 is a bottom plan view illustrating a lower side of a second lamp module according to the embodiment of the present disclosure.

Referring to FIGS. 16 to 18, a lamp 1010 for a vehicle according to the embodiment of the present disclosure may include the first lamp modules 10100 and the second lamp modules 10200 (see FIG. 16). The first lamp module 10100 to be described below may be identical in configuration to the above-mentioned lamp module. Hereinafter, the first lamp module 10100 and the components thereof are designated by the same reference numerals as the above-mentioned lamp module and the components thereof. In addition, the second lamp module 10200 differs from the above-mentioned lamp module in terms of the shape of the light entering surface 10160 and the presence or absence of the recessed groove 10156.

The first lamp module 10100 may include a first light source unit 10110, and a first lens structure 10130 configured to form a first light distribution pattern by using light emitted from the first light source unit 10110. Further, the second lamp module 10200 includes a second light source unit 10210, and a second lens structure 10230 configured to form a second light distribution pattern different in properties from the first light distribution pattern by using light emitted from the second light source unit 10210. The first light source unit 10110 may include a first light source 10111 and a first collimator 10113. The second light source unit 10210 may include a second light source and a second collimator.

In this case, the configuration in which the first light distribution pattern and the second light distribution pattern have different properties means that a pattern image of the light projected through the first lens structure 10130 and a pattern image of the light projected through the second lens structure 10230 are different from each other. For example, this may be implemented by a difference in shape between the first lens structure 10130 and the second lens structure 10230.

For example, the first light distribution pattern formed by the first lens structure 10130 may be a light distribution pattern (hot zone) implemented to ensure a visual field in a front central region (see FIG. 14). Further, the second light distribution pattern formed by the second lens structure 10230 may be a light distribution pattern (wide zone) implemented to ensure a visual field in a peripheral region in front of the vehicle and ensure visibility when the vehicle turns (see FIG. 15). Further, the low beam pattern, which is an integrated pattern, may be formed by projecting the first light distribution pattern and the second light distribution pattern forward.

The low beam pattern may be formed as the first light distribution pattern and the second light distribution pattern overlap each other.

The first lens structure 10130 includes a first recessed portion 10150 recessed toward a central region of the first lens structure 10130 based on the upward/downward direction. The first recessed portion 10150 includes a light blocking region configured to block the light emitted from the first light source unit 10110, and a light reflection region configured to reflect a part of the light and allow the light to exit forward.

Further, the second lens structure 10230 includes a second recessed portion 10250 recessed toward a central region of the second lens structure 10230 based on the upward/downward direction. The second recessed portion 10250 includes a light blocking region configured to block the light emitted from the second light source unit 10210, and a light reflection region configured to reflect a part of the light and allow the light to exit forward.

The light entering surfaces 10160 and 10260 of the first and second lens structures 10130 and 10230, where the light enters, may have different shapes. That is, the first light entering surface 10160 and the second light entering surface 10260 may be formed in different shapes.

Specifically, the first light entering surface 10160 may have a horizontal shape defined when viewed from above, and a vertical shape defined when viewed from the lateral side. The horizontal and vertical shapes of the first light entering surface 10160 may be convexly curved in the direction toward the first light source unit 10110. That is, both the horizontal and vertical shapes of the first light entering surface 10160 may be convex toward the first light source unit 10110.

As described above, the first light entering surface 10160 may be configured to maximally collect the horizontal light and the vertical light, which are emitted from the first light source unit 10110, onto the first body portion 10140, thereby minimizing a loss of light and improving optical efficiency. The first lamp module 10100 may effectively form the first light distribution pattern (hot zone) advantageous in illumination at a long distance in order to ensure the visual field in the central region.

The second light entering surface 10260 may have a horizontal shape defined when viewed from above, and a vertical shape defined when viewed from the lateral side. The horizontal shape may be a concave shape curved in a direction opposite to the direction toward the second light source unit 10210 or a flat shape. The vertical shape may be a convex shape curved in the direction toward the second light source unit 10210. The second light entering surface 10260 may be provided in the form of an anamorphic lens, such that the magnification in the horizontal direction and the magnification in the vertical direction are different from each other.

As described above, the second light entering surface 10260 may collect the vertical light, which is emitted from the second light source unit 10210, into the first body portion 10140. The second light entering surface 10260 may diffuse the horizontal light. Therefore, the second light entering surface 10260 may implement a light pattern in which the light exiting through the second lens structure 10230 is widely spread in the horizontal direction. Therefore, the second lamp module 10200 may effectively form the second light distribution pattern (wide zone) advantageous in ensuring visibility in respect to the peripheral region in front of the vehicle and visibility when the vehicle turns. In addition, according to the embodiment of the present disclosure, the light entering the second light entering surface 10260 is diffused in the horizontal direction. Therefore, it is possible to satisfy all the performance and the regulations that define conditions of diffusion angles of the low beam pattern.

Meanwhile, the first recessed portion 10150 may have a shape recessed toward the central region of the first lens structure 10130. In addition, the second recessed portion 10250 may have a shape recessed toward the central region of the second lens structure 10230.

The first lens structure 10130 may include: the first body portion 10140 having the first recessed portion 10150; the first light entering surface 10160 formed on the surface where the light from the first body portion 10140 enters, the first light entering surface 10160 being configured to allow the light emitted from the first light source unit 10110 to enter the first body portion 10140; and the first light exiting surface 10170 formed on the surface where the light from the first body portion 10140 exits, the first light exiting surface 10170 being configured to allow the light entering the first body portion 10140 to exit forward. Further, the first recessed portion 10150 may be formed in the first body portion 10140.

The second lens structure 10230 may include: the second body portion 10240 having the second recessed portion 10250; the second light entering surface 10260 formed on the surface where the light from the second body portion 10240 enters, the second light entering surface 10260 being configured to allow the light emitted from the second light source unit 10210 to enter the second body portion 10240; and the second light exiting surface 10270 formed on the surface where the light from the second body portion 10240 exits, the second light exiting surface 10270 being configured to allow the light entering the second body portion 10240 to exit forward. Further, the second recessed portion 10250 may be formed in the second body portion 10240.

The first recessed portion 10150 may include: a first-first surface 10151 having a first-first reflective layer 10152 configured to reflect light; and a first-second surface 10153 extending forward from the first-first surface 10151 and having a first-second reflective layer 10154 configured to reflect light. Further, the first recessed portion 10150 may include a first-third surface 10159 extending from the first-second surface 10153.

In addition, the second recessed portion 10250 may include: a second-first surface 10251 having a second-first reflective layer 10252 configured to reflect light; and a second-second surface 10253 extending forward from the second-first surface 10251 and having a second-second reflective layer 10254 configured to reflect light.

In this case, the first-second surface 10153 may include the recessed groove 10156 formed to be concave upward so as to block a part of the light entering an upper side of the first-second surface 10153. The recessed groove 10156 is a portion that reflects a part of the light reaching the first-second surface 10153 so as to prevent the light from exiting through the first light exiting surface 10170. The recessed groove 10156 may be formed in the first-second surface 10153 and have a shape that may change a propagation route of the light.

In contrast, the recessed groove 10156 may not be formed in the second-second surface 10253. As described above, the low beam pattern, which is an integrated pattern, may be formed by projecting the first light distribution pattern and the second light distribution pattern. In this case, the first light distribution pattern formed by the first lamp module 10100 has the pattern that blocks the light and is provided in the region corresponding to the region in which the recessed groove 10156 of the first-second surface 10153 is formed. The second light distribution pattern formed by the second lamp module 10200 that transmits the light and is provided in the region corresponding to the region in which the recessed groove 10156 of the first-second surface 10153 is formed.

Therefore, in the entire low beam pattern made by integrating the first light distribution pattern and the second light distribution pattern, the brightness in the region corresponding to the region in which the recessed groove 10156 of the first-second surface 10153 is formed may be lower than the brightness of the other portions. Therefore, according to the present disclosure, it is possible to satisfy the minimum brightness required by the regulations while minimizing light blindness caused to the driver in the oncoming vehicle.

As described above, according to the lamp module and the lamp for a vehicle according to the embodiment of the present disclosure, the recessed portion is formed by deforming the shape of the body portion of the lens structure. Therefore, it is possible to form the cut-off line of the low beam pattern even without a separate shield member.

In addition, according to the embodiment of the present disclosure, the recessed portion may include the light reflection region as well as the light blocking region, thereby improving efficiency by minimizing a loss of light caused by blocking the light.

In addition, according to the embodiment of the present disclosure, the recessed groove is formed in the recessed portion of at least some of the plurality of lamp modules configured to form the low beam pattern, which makes it possible to satisfy the minimum brightness of the low beam required by the regulations while preventing light blindness from being caused to the drive in the oncoming vehicle.

The present disclosure has been described with reference to the limited embodiments and the drawings, but the present disclosure is not limited thereto. The present disclosure may be carried out in various forms by those skilled in the art, to which the present disclosure pertains, within the technical spirit of the present disclosure and the scope equivalent to the appended claims.

What is claimed is:

1. A lamp for a vehicle, the lamp comprising:
- a light source; and
- a light guide body including a light entering portion disposed at one side of the light source, a light exiting portion configured such that light entering the light entering portion exits the light exiting portion, and a surface extending from the light entering portion to the light exiting portion,
- wherein the surface of the light guide body comprises:
  - a first surface extending toward the light exiting portion;
  - a second surface extending toward the light exiting portion; and
  - a connection portion between the first and second surfaces and including a curved connection portion.

2. The lamp of claim 1, wherein the first surface has a recessed grove concaved upwardly.

3. The lamp of claim 1, wherein the first surface comprises a recessed groove concaved upwardly so as to block a part of the light entering an upper side of the first surface.

4. The lamp of claim 1, wherein the first surface is parallel with an optical axis of the light exiting portion.

5. The lamp of claim 1, wherein the connection portion further comprises straight connection portions formed at two opposite sides of the curved connection portion.

6. The lamp of claim 5, wherein the first surface is inclined with respect to a horizontal reference surface extending parallel to an optical axis of the light guide body.

7. The lamp of claim 1, wherein the curved connection portion has a predetermined curvature.

8. The lamp of claim 1, wherein the curved connection portion has a shape corresponding to a line connecting a plurality of focal points formed for respective colors of the light emitted from the light source and entering through the light entering portion.

9. The lamp of claim 1, wherein the curved connection portion has a shape recessed in a direction from the light exiting portion to the light entering portion.

10. The lamp of claim 9, wherein the second surface is connected to the first surface through the connection portion and comprises a vertical surface having a vertical cross-section corresponding to a shape of the connection portion as the connection portion vertically extends downward.

11. The lamp of claim 10, wherein the second surface further comprises:
- a horizontal surface connected to the vertical surface; and
- an inclined surface connected to the horizontal surface and inclined downward in the direction from the light entering portion to the light exiting portion.

12. The lamp of claim 1, wherein the connection portion is formed symmetrically in a leftward/rightward direction with respect to a central portion of the light guide body when viewing the light guide body from above.

13. The lamp of claim 1, wherein the light entering portion has a curved shape convexly protruding toward the light source.

14. The lamp of claim 1, wherein the light exiting portion has a curved shape protruding in a direction in which the light entering through the light entering portion exits.

15. A vehicle comprising:
- a lamp for a vehicle, comprising:
  - a light source; and
  - a light guide body including a light entering portion disposed at one side of the light source, a light exiting portion configured such that light entering the light entering portion exits the light exiting portion, and a surface extending from the light entering portion to the light exiting portion,
  - wherein the surface of the light guide body comprises:
    - a first surface extending toward the light exiting portion;
    - a second surface connected to the first surface through a connection portion and extending toward the light exiting portion; and
    - a connection portion between the first and second surface and having a curved connection portion.

16. A lamp for a vehicle, comprising a first lamp module and a second lamp module, wherein each of the first and second lamp modules comprises:
- a light source; and
- a light guide body including a light entering portion disposed at one side of the light source, a light exiting portion configured such that light entering the light entering portion exits the light exiting portion, and a surface extending between the light entering portion and the light exiting portion,
- wherein the surface of the light guide body comprises:
  - a first surface extending toward the light exiting portion;
  - a second surface extending toward the light exiting portion; and
  - a connection portion between the first and second surfaces and including a curved connection portion,
  - wherein the first surface of the first or second lamp module includes a recessed groove concaved upwardly.

* * * * *